United States Patent
Mattes

(10) Patent No.: US 7,093,586 B2
(45) Date of Patent: Aug. 22, 2006

(54) METHOD FOR CONTROLLING A FUEL METERING SYSTEM OF AN INTERNAL COMBUSTION ENGINE

(75) Inventor: Patrick Mattes, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 10/510,897

(22) PCT Filed: May 28, 2003

(86) PCT No.: PCT/DE03/01738

§ 371 (c)(1),
(2), (4) Date: Oct. 8, 2004

(87) PCT Pub. No.: WO2004/003366

PCT Pub. Date: Jan. 8, 2004

(65) Prior Publication Data

US 2005/0161026 A1 Jul. 28, 2005

(30) Foreign Application Priority Data

Jun. 28, 2002 (DE) ................................ 102 29 019

(51) Int. Cl.
*F02M 51/00* (2006.01)
(52) U.S. Cl. ....................... 123/478; 123/480
(58) Field of Classification Search ................. 123/478, 123/480, 488, 490
See application file for complete search history.

(56) References Cited

U.S. PATENT DOCUMENTS

| | | | | |
|---|---|---|---|---|
| 5,070,836 A | | 12/1991 | Wahl et al. | |
| 5,575,264 A | * | 11/1996 | Barron | 123/486 |
| 5,634,448 A | * | 6/1997 | Shinogle et al. | 123/480 |
| 5,641,891 A | * | 6/1997 | Frankl et al. | 73/1.72 |
| 5,747,684 A | * | 5/1998 | Pace et al. | 73/119 A |
| 5,839,420 A | * | 11/1998 | Thomas | 123/478 |
| 6,112,720 A | | 9/2000 | Matta | |

FOREIGN PATENT DOCUMENTS

| | | |
|---|---|---|
| DE | 199 45 618 | 3/2001 |
| DE | 102 15 610 | 10/2002 |

\* cited by examiner

*Primary Examiner*—Thomas Moulis
(74) *Attorney, Agent, or Firm*—Kenyon & Kenyon LLP

(57) ABSTRACT

A method for controlling a fuel metering system of an internal combustion engine. A activation duration of at least one electrically operated injector determines the injected fuel quantity. The minimum activation duration during which fuel is only just injected being determined in certain operating states. The activation duration being increased/reduced starting at an initial value, and the activation duration during which a signal undergoes a change being stored as the minimum activation duration, in which the difference between the activation duration during which a signal undergoes a change and the stored minimum activation duration is determined, from which correction values for the fuel quantity map of the injector are determined and stored using at least one transfer function, which characterizes the relationship between the minimum injection and activation durations at several test points of the injector and/or the relationship between the activation durations at different test points of the injector.

4 Claims, 2 Drawing Sheets

US 7,093,586 B2

METHOD FOR CONTROLLING A FUEL METERING SYSTEM OF AN INTERNAL COMBUSTION ENGINE

FIELD OF THE INVENTION

The present invention relates to a method for controlling a fuel metering system of an internal combustion engine.

BACKGROUND INFORMATION

A method and device for controlling a fuel metering system of an internal combustion engine is discussed, for example, in German patent document no. 199 45 618. In this method, the activation duration of at least one electrically operated valve determines the fuel quantity to be injected. The minimum activation duration during which fuel is only just injected is determined in certain operating states. The activation duration is increased or reduced, starting at an initial value. The activation duration during which a signal undergoes a change is stored as the minimum activation duration. The signal used is a quantity characterizing the uniformity of rotation, an output signal of a lambda sensor, or an output signal of an ion current sensor. This method allows for an injection quantity drift over the lifetime of the fuel injector in the range of the pilot injection.

Non-prepublished German patent document no. 102 15 610 discusses a system and method for correcting the injection behavior of injectors, in which, in order to increase the product output, an injector fuel-quantity compensation is carried out at several test points, which may be 4 test points, i.e., during the pilot injection, during idle operation, at the emission point, and during full-load operation.

This injector fuel-quantity compensation is necessary because injectors of that kind have different fuel quantity maps due to their mechanical manufacturing tolerances. A "fuel quantity map" is understood to be the relationship between the injection quantity, the rail pressure, and the activation time (activation duration). As a consequence, in spite of the electrically defined control, each individual injector fills the combustion chamber with different fuel quantities.

In fact, to achieve as low a fuel consumption as possible while complying with strict exhaust emission standards, the injectors may only have very small tolerances in terms of the injection quantity during operation. These small tolerances required cannot be met due to the mechanical manufacturing tolerances. In order to nevertheless guarantee a defined injection quantity of the injectors, the injectors are measured for their injection quantity at characteristic operating points or test points after manufacture, and are classified. The respective class must be known to the engine control unit during the operation of the internal combustion engine so that the control can be adapted to the particular characteristics of the class specifically for each injector. The class information is stored on the injector, for example, by different codes such as a bar code, by resistors on the injector, or by plaintext on the injector.

Moreover, electronic storage means, in which are stored, for example, the class information, may be provided in the injectors. These values may be read out from the injector by the control unit via an interface and used in the subsequent operation.

Over their lifetime, such common rail injectors are observed to have a fuel quantity drift, which is different for each individual injector and depends, for example, on the load profile or on the type of injector. This fuel quantity drift has a negative effect in terms of low fuel consumption, on compliance with strict exhaust emission standards, and with respect to, for example, the noise level of the internal combustion engine. Until now, correction of the injection quantity drift over the lifetime of the injectors was only done in the pilot injection plateau using a method discussed in German patent document no. 199 45 618. In contrast, fuel quantity drifts at other operating points can only be compensated for to a very limited degree, if at all.

SUMMARY OF THE INVENTION

It is therefore an object of the exemplary embodiment and/or exemplary method of the present invention to provide a method which allows for fuel quantity correction, in particular, for correction of the fuel quantity drift over the lifetime of a piezoelectric common rail injector at operating points outside of the range of the pilot injection.

In an exemplary method for controlling injectors of a fuel metering system of an internal combustion engine of the type mentioned at the outset, this objective is achieved by the features of the method described herein.

The exemplary embodiment and/or exemplary method of the present invention includes determining correction values for the fuel quantity map of the injector from the difference between the activation duration during which a signal undergoes a change and the stored minimum activation duration using transfer functions which define the relationship between the minimum activation duration and the activation duration at different test points of the injector, respectively, and/or the relationship between the activation durations at several test points of the injector. Thus, in a way, the entire fuel quantity map of the injector is inferred based on the range of the pilot injection, in which fuel quantity drifts can be determined and corrected, using transfer functions.

These transfer functions, in turn, may be determined during the injector fuel-quantity compensation at the test points.

One exemplary embodiment includes storing the transfer functions on the injector, i.e., to encode the injector with these transfer functions as well.

In accordance with another exemplary embodiment, the correction values are stored in an engine control unit.

DETAILED DESCRIPTION

Figure 1:
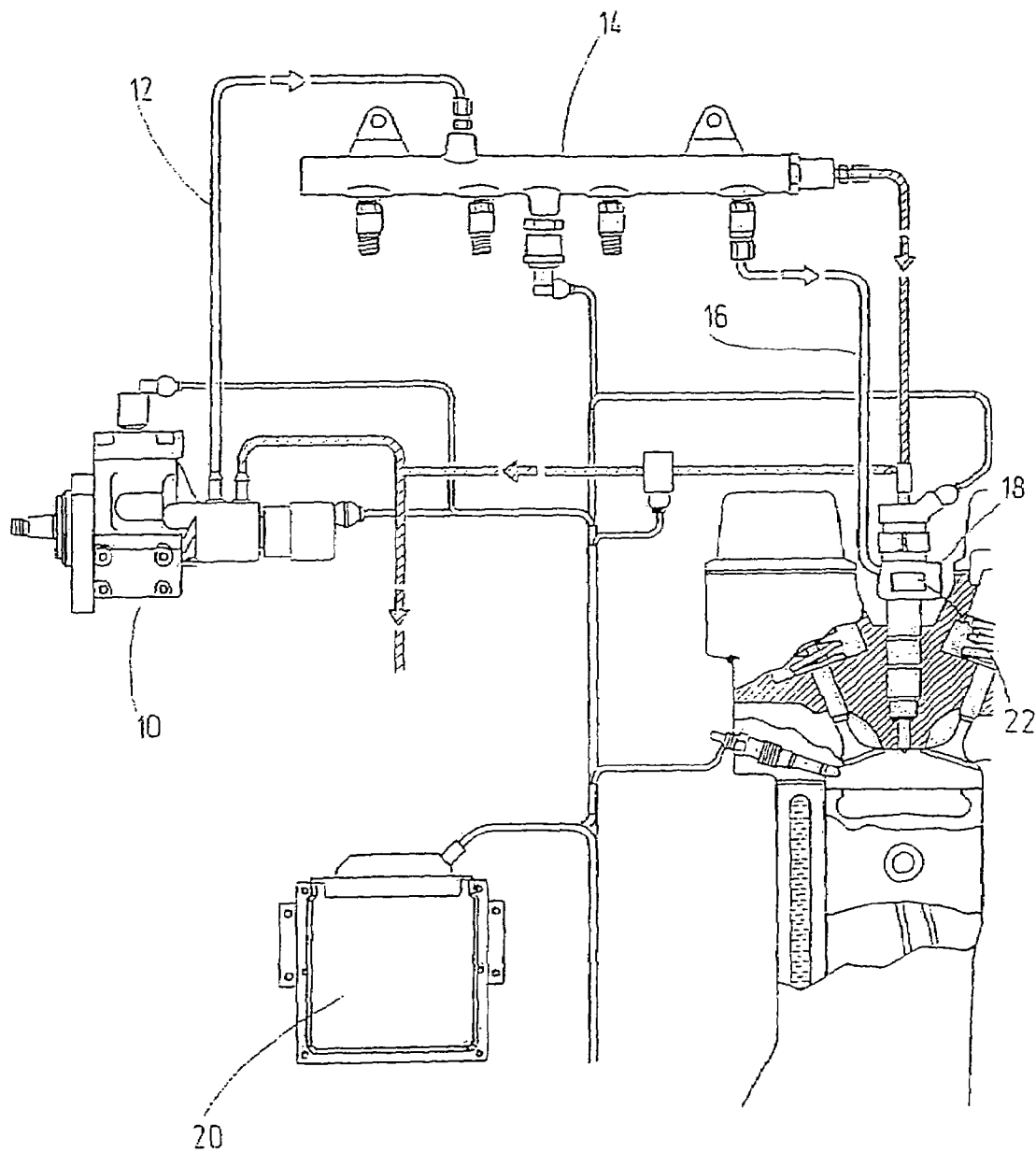
FIG. 1 shows a schematic representation of a portion of a common rail system known from the prior art, in which the exemplary method according to the present invention is used.

FIG. 1 shows the high-pressure stage of a common rail accumulator injection system, of which only the main components and components that are essential for understanding the present invention will be explained in more detail hereinafter.

The system includes a high-pressure pump 10 which is in communication with high-pressure accumulator ("rail") 14 via a high-pressure delivery line 12. High-pressure accumulator 14 is connected to injectors 18 via further high-pressure delivery lines. In this representation, a high-pressure delivery line 16 and an injector 18 are shown. Injector 18 is mounted in an internal combustion engine of a motor vehicle. The system shown is controlled by an engine control unit 20, which controls, in particular, injector 18.

Injector 18 is provided with a device 22 for storing information that relates to the individual injector 18. The information stored in device 22 may be taken into account by engine control unit 20 so that each injector 18 may be controlled individually. The information may consists of correction values for the fuel quantity map of injector 18. Device 22 for storing the information may be implemented, for example, as a data memory, or also as one or more electrical resistors, as a bar code, by alphanumeric coding, or the like, or also by a semiconductor integrated circuit located on injector 18. Engine control unit 20 may also have a semiconductor integrated circuit for evaluating the information stored in device 22.

The injection quantity metered in by each injector 18 is defined as a function of the rail pressure in a characteristic map stored in engine control unit 20, the characteristic map being determined based on several test points (pilot injection, idling, emission point, full load), which correspond to different operating states of the internal combustion engine. At each of these test points, fuel quantity compensation is carried out in a manner which is known per se and DISCUSSED in German patent document no. 102 15 610. The injection quantity is determined by the injection duration of injector 18; i.e., the time that passes between the start of injection and the end of injection.

In order to enable fuel quantity metering over the entire operating range of the internal combustion engine and injector 18, the compensation values are interpolated between the nodes defined by the test points.

Over the lifetime of injectors 18, a fuel quantity drift can be observed to the effect that the injection quantity, which was originally determined by defining the start of injection and the injection duration, changes over the life of injectors 18.

Figure 2:
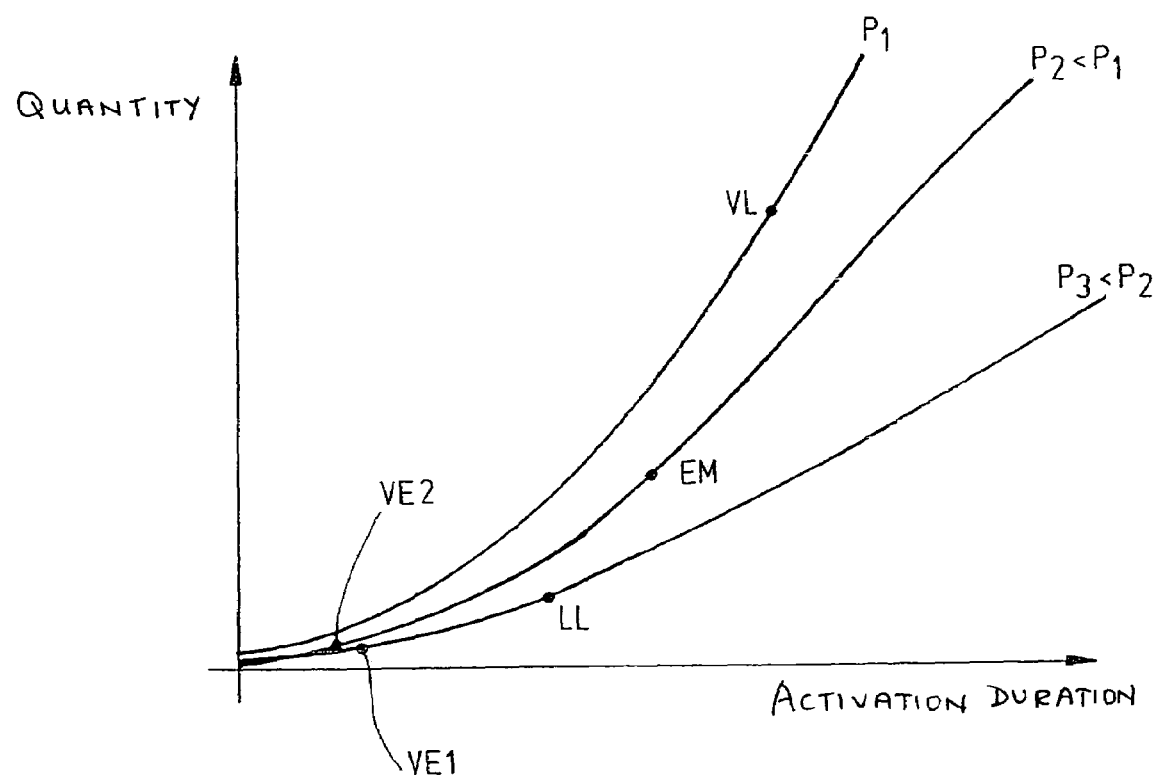
FIG. 2 schematically shows the injection quantity over the activation duration for different injection pressures to illustrate the exemplary method according to the present invention.

To compensate for this fuel quantity drift in a common rail injector, for example, in a common rail injector having a fully ballistic characteristic map without pilot injection plateau (VE), which is schematically shown in FIG. 2, an injector fuel-quantity compensation (IMA) is carried out, for example, at the five aforementioned test points LL (idling), VE1 (pilot injection 1), EM (emission point), VE2 (pilot injection 2), and VL (full load). In addition, transfer functions Ü1=f(VE1, LL), Ü2=f(VE2, EM) and Ü3=f(EM, VL) are determined.

In order to implement a fuel quantity correction over the lifetime of injector 18, then the minimum activation duration during which fuel is only just injected is determined at two operating points VE1 and VE2; the activation duration being increased or reduced starting at an initial value, and the activation duration during which a signal undergoes a change being stored as the minimum activation duration VE1' and VE2', respectively. Then, the differences Delta1 (VE1, VE1') and Delta2 (VE2, VE2') are determined, respectively. From these differences, correction values for the fuel quantity map of the injector are now determined and stored using the transfer functions Ü1, Ü2, Ü3, which define the relationship between minimum injection duration VE1 and the injection duration during idle operation LL, the relationship between the second minimum injection duration and the injection duration at emission point EM, and the relationship between different operating points, for example, the injection duration injection duration at emission point EM and the injection duration during full-load operation VL:

LL'=f(LL, Delta1, Ü1), EM'=f(EM, Delta2, Ü2) und VL'=f(VL, EM', Ü3).

Thus, in a way, the injection durations at the further test points LL', EM', VL' of the fuel quantity map of injector 18 are inferred from the so-called "zero fuel quantity correction", i.e., from the correction of the minimum injection duration or minimum injection durations VE1, VE2 using transfer functions Ü1, Ü2, Ü3.

These transfer functions may be determined during the injector fuel-quantity compensation, or also independently of the injector fue-quantity compensation.

Transfer functions Ü1, Ü2, Ü3 may either be stored on injector 18, i.e., injector 18 may be encoded with the transfer functions, or be stored in engine control unit 20 as a characteristic curve. Advantageously, map points LL'=f(LL, Delta1, Ü1), EM'=f(EM, Delta2, Ü2) and VL'=f(VL, EM', Ü3) are corrected each time a zero fuel quantity correction is carried out. In this manner, a closed fuel quantity control loop is achieved.

What is claimed is:

1. A method for controlling a fuel metering system of an internal combustion engine, wherein an activation duration of at least one electrically operated injector to determines a fuel quantity to be injected, the method comprising:

performing a null quantity correction, wherein the null quantity correction includes determining a minimum activation duration during which a minimum quantity of fuel is injected, wherein the determination of the minimum activation duration includes adjusting an activation duration from an initial value, and wherein an activation duration in which a change in a characteristic signal appears is selected as the minimum activation duration; and determining activation durations at a plurality of test points of a quantity characteristics map of the injector, based on the null quantity correction and at least one of: a) at least one transfer function that characterizes a relationship between the minimum activation durations and activation durations at the plurality of test points; and b) at least one transfer function that characterizes a relationship between the activation durations at the plurality of test points.

2. The method as recited in claim 1, wherein the at least one of: a) at least one transfer function that characterizes a relationship between the minimum activation durations and activation durations at the plurality of test points; and b) at least one transfer function that characterizes a relationship between the activation durations at the plurality of test points, is determined during an injector fuel-quantity compensation.

3. The method as recited in claim 1, wherein the at least one of: a) at least one transfer function that characterizes a relationship between the minimum activation durations and activation durations at the plurality of test points; and b) at least one transfer function that characterizes a relationship between the activation durations at the plurality of test points, is stored on the injector.

4. The method as recited in claim 1, wherein the at least one of: a) at least one transfer function that characterizes a relationship between the minimum activation durations and activation durations at the plurality of test points; and b) at least one transfer function that characterizes a relationship between the activation durations at the plurality of test points, is stored in an engine control unit.

* * * * *